United States Patent
Jin et al.

(10) Patent No.: US 10,607,601 B2
(45) Date of Patent: Mar. 31, 2020

(54) SPEECH RECOGNITION BY SELECTING AND REFINING HOT WORDS

(71) Applicant: International Business Machines Corporation, Armonk, NY (US)

(72) Inventors: Feng Jin, Beijing (CN); Wen Liu, Beijing (CN); Li Jun Ma, Beijing (CN); Peng Cheng P P Zhu, Suzhou (CN); Yong Qin, Beijing (CN); Qin Shi, Beijing (CN); Shi Lei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/592,773

(22) Filed: May 11, 2017

(65) Prior Publication Data

US 2018/0330717 A1    Nov. 15, 2018

(51) Int. Cl.
| | |
|---|---|
| *G10L 15/12* | (2006.01) |
| *G10L 15/197* | (2013.01) |
| *G10L 15/187* | (2013.01) |
| *G10L 15/08* | (2006.01) |
| *G10L 15/18* | (2013.01) |

(52) U.S. Cl.
CPC ............ *G10L 15/12* (2013.01); *G10L 15/187* (2013.01); *G10L 15/1815* (2013.01); *G10L 15/197* (2013.01); *G10L 2015/088* (2013.01)

(58) Field of Classification Search
CPC ......... G10L 15/08; G10L 15/12; G10L 15/18; G10L 15/1815; G10L 15/183; G10L 15/197; G10L 15/187

USPC ................................ 704/231, 241, 251, 257
See application file for complete search history.

(56) References Cited

U.S. PATENT DOCUMENTS

| | | | | | |
|---|---|---|---|---|---|
| 5,216,720 | A | * | 6/1993 | Naik | ........................ G10L 17/00 704/272 |
| 5,218,668 | A | * | 6/1993 | Higgins | .................. G10L 15/00 704/200 |
| 5,255,342 | A | * | 10/1993 | Nitta | ........................ G06K 9/64 704/200 |
| 5,732,394 | A | * | 3/1998 | Nakadai | .................. G10L 15/04 704/238 |

(Continued)

FOREIGN PATENT DOCUMENTS

EP    1136983 A1    9/2001

OTHER PUBLICATIONS

Hui, L et al., "Oov Detection by Joint Word/Phone Lattice Alignment", ASRU 2007, Dec. 9-13, 2007, pp. 478-483.

(Continued)

*Primary Examiner* — James S Wozniak
(74) *Attorney, Agent, or Firm* — Scully, Scott, Murphy & Presser, P.C.; Joseph Petrokaitis, Esq.

(57) ABSTRACT

Speech recognition is performed by receiving a speech signal that includes spoken phones. A dynamic time warping procedure is applied to the received speech signal to generate a time-warped signal. The time-warped signal is compared to a plurality of stored reference patterns to identify a set of stored reference patterns that are most similar to the time-warped signal. A candidate hot word is selected from a list using the identified set of stored reference patterns. The selection of the candidate hot word is then refined.

18 Claims, 8 Drawing Sheets

(56) References Cited

U.S. PATENT DOCUMENTS

| | | | | |
|---|---|---|---|---|
| 5,832,428 | A * | 11/1998 | Chow | G10L 15/063 704/254 |
| 5,995,928 | A | 11/1999 | Nguyen et al. | |
| 6,070,140 | A * | 5/2000 | Tran | G06F 1/3203 704/232 |
| 6,076,054 | A | 6/2000 | Vysotsky et al. | |
| 6,094,476 | A * | 7/2000 | Hunt | G10L 15/22 379/88.04 |
| 6,304,844 | B1 | 10/2001 | Pan et al. | |
| 6,393,395 | B1 * | 5/2002 | Guha | G06K 9/00872 382/186 |
| 6,671,669 | B1 * | 12/2003 | Garudadri | G10L 15/32 704/255 |
| 6,836,758 | B2 * | 12/2004 | Bi | G10L 15/12 704/231 |
| 7,143,034 | B2 | 11/2006 | Jeong et al. | |
| 7,533,019 | B1 * | 5/2009 | Hakkani-Tur | G10L 15/065 704/252 |
| 7,761,296 | B1 * | 7/2010 | Bakis | G10L 13/02 704/238 |
| 8,352,265 | B1 * | 1/2013 | Lin | G10L 15/142 704/256 |
| 8,473,293 | B1 * | 6/2013 | Mengibar | G10L 15/06 704/10 |
| 9,123,333 | B2 | 9/2015 | Amarilli et al. | |
| 9,275,637 | B1 * | 3/2016 | Salvador | G10L 15/01 |
| 9,336,769 | B2 | 5/2016 | Terao et al. | |
| 9,799,333 | B2 * | 10/2017 | Kintzley | G10L 15/22 |
| 2001/0010039 | A1 * | 7/2001 | Yang | G10L 15/08 704/239 |
| 2002/0040296 | A1 * | 4/2002 | Kienappel | G10L 15/02 704/220 |
| 2002/0116196 | A1 * | 8/2002 | Tran | G06F 1/3203 704/270 |
| 2003/0078777 | A1 * | 4/2003 | Shiau | G10L 15/30 704/251 |
| 2004/0024601 | A1 * | 2/2004 | Gopinath | G10L 15/22 704/270 |
| 2004/0049387 | A1 * | 3/2004 | Jeong | G10L 15/12 704/241 |
| 2004/0122672 | A1 * | 6/2004 | Bonastre | G10L 15/063 704/256.7 |
| 2004/0249637 | A1 * | 12/2004 | Baker | G10L 15/1822 704/239 |
| 2005/0108012 | A1 * | 5/2005 | Roth | G10L 15/08 704/252 |
| 2005/0119885 | A1 * | 6/2005 | Axelrod | G10L 15/063 704/231 |
| 2006/0064177 | A1 * | 3/2006 | Tian | G10L 15/197 700/1 |
| 2007/0055525 | A1 * | 3/2007 | Kennewick | G10L 15/08 704/257 |
| 2008/0114595 | A1 * | 5/2008 | Vair | G10L 15/08 704/236 |
| 2009/0182559 | A1 * | 7/2009 | Gerl | G10L 15/08 704/235 |
| 2009/0220926 | A1 * | 9/2009 | Rechlis | G09B 19/04 434/185 |
| 2010/0268536 | A1 * | 10/2010 | Suendermann | G10L 15/063 704/243 |
| 2011/0196678 | A1 * | 8/2011 | Hanazawa | G10L 15/1807 704/251 |
| 2012/0221335 | A1 * | 8/2012 | Zhao | G10L 15/063 704/250 |
| 2013/0185070 | A1 * | 7/2013 | Huo | G10L 15/063 704/243 |
| 2013/0275117 | A1 | 10/2013 | Winer | |
| 2014/0012586 | A1 * | 1/2014 | Rubin | G10L 25/51 704/273 |
| 2014/0236600 | A1 * | 8/2014 | Lu | G10L 15/063 704/251 |
| 2015/0106082 | A1 * | 4/2015 | Ge | G10L 15/187 704/10 |
| 2016/0027436 | A1 * | 1/2016 | Lee | G10L 15/22 704/236 |
| 2016/0111089 | A1 * | 4/2016 | Kim | G10L 15/22 704/239 |
| 2016/0300566 | A1 * | 10/2016 | Hofer | G10L 15/08 |
| 2017/0229115 | A1 * | 8/2017 | Lee | G10L 15/16 |
| 2017/0270917 | A1 | 9/2017 | Morishita et al. | |

OTHER PUBLICATIONS

Das, T et al, "Comparison of DTW Score and Warping path for Text Dependent Speaker Verification System",2015 International Conference on Circuit, Power and Computing Technologies 2015, Mar. 19-20, 2015, pp. 1-4.

* cited by examiner

SPEECH RECOGNITION BY SELECTING AND REFINING HOT WORDS

FIELD

The present invention relates to speech recognition and, in particular, to performing speech recognition by selecting and refining hot words.

BACKGROUND

Speech recognition applications are becoming very popular. For many application users, there are some spoken words that the application may not correctly recognize. For example, a list of named contacts stored in a mobile phone is often out of vocabulary (OOV) for the application. Although these specific names could be added to the vocabulary for the application, this process is often costly and time-consuming. Likewise, vocabulary words would have to be added for a multiplicity of users, and for each of one or more speech recognition applications that may be used.

SUMMARY

The following summary is merely intended to be exemplary. The summary is not intended to limit the scope of the claims.

A computer-implemented method for performing speech recognition, in one aspect, may comprise receiving, by a computer, a speech signal including one or more spoken phones; applying, by the computer, a dynamic time warping procedure to the received speech signal to generate a time-warped signal; comparing, by the computer, the time-warped signal to a plurality of stored reference patterns to identify a set of one or more stored reference patterns of the plurality of stored reference patterns that are most similar to the time-warped signal; selecting, by the computer, a candidate hot word from a list of candidate hot words using the identified set of one or more stored reference patterns; and refining, by the computer, the selection of the candidate hot word.

Other aspects comprise a computer program product for performing speech recognition and an apparatus for performing speech recognition.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
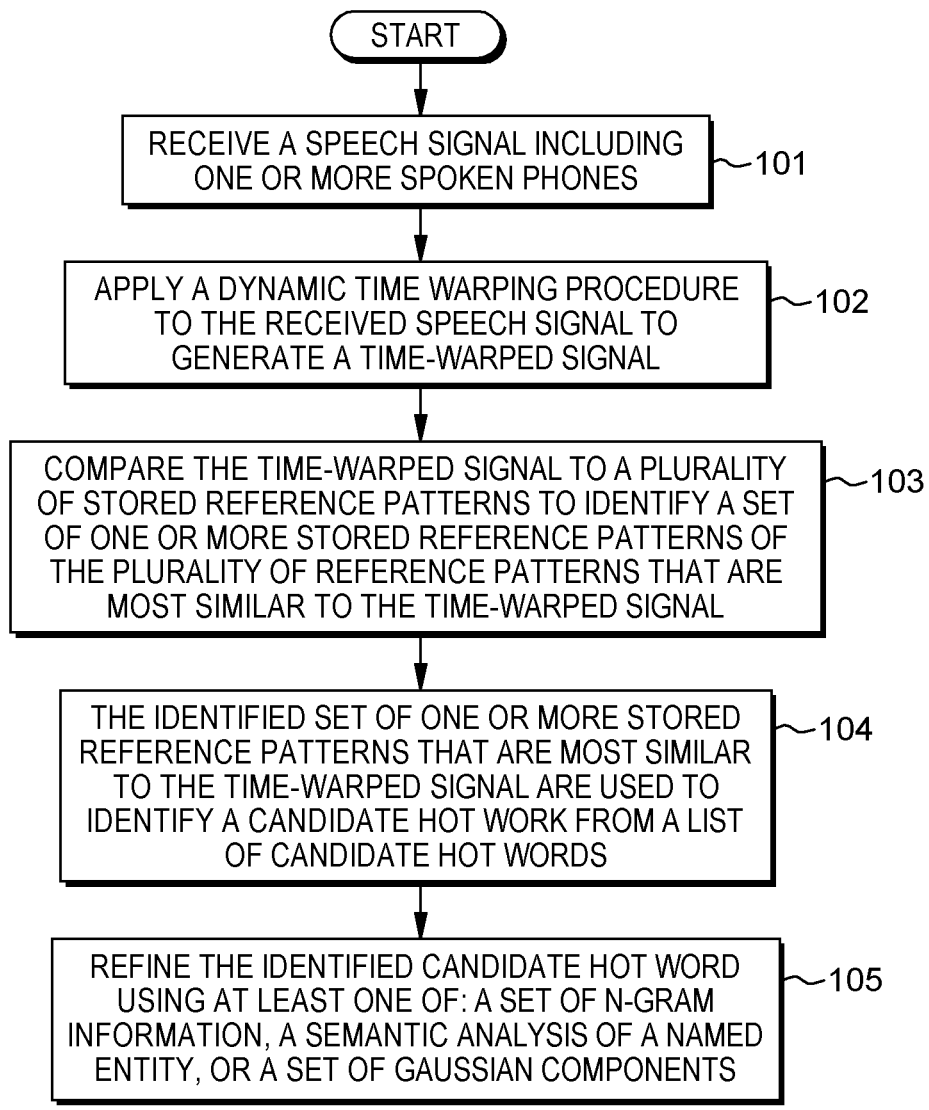
FIG. 1 illustrates an exemplary computer-implemented method for performing speech recognition in accordance with one or more embodiments of the present invention.

FIG. 1 illustrates an exemplary computer-implemented method for performing speech recognition in accordance with one or more embodiments of the present invention. The method commences at block 101 where a speech signal including one or more spoken phones is received. As used herein, a phone is a speech sound considered as a physical event without regard to its place in the sound system of a language. Next, at block 103, a dynamic time warping procedure is applied to the received speech signal to generate a time-warped signal. The time-warped signal is compared to a plurality of stored reference patterns to identify a set of one or more stored reference patterns of the plurality of stored reference patterns that are most similar to the time-warped signal (block 105). This comparison may be performed using an acoustic similarity matrix.

At block 106, the identified set of one or more stored reference patterns that are most similar to the time-warped signal are used to select a candidate hot word from a list of candidate hot words. As used herein, the term "hot word" refers to a word that belongs to a set of vocabulary words stored in an electronically searchable dictionary. The list of candidate hot words may be generated using the acoustic similarity matrix, or using the electronically searchable dictionary. Then, at block 107, the selection of the candidate hot word is refined using at least one of: a set of n-gram information, a semantic analysis of a named entity, or a set of Gaussian components. As used herein, this refining refers to evaluating a probability of occurrence of the identified candidate hot word. If the probability of occurrence is low or less than a predetermined threshold, then the identified candidate word is changed to another candidate hot word having a greater probability of occurrence. Otherwise, the identified candidate word is unchanged.

Figure 2:
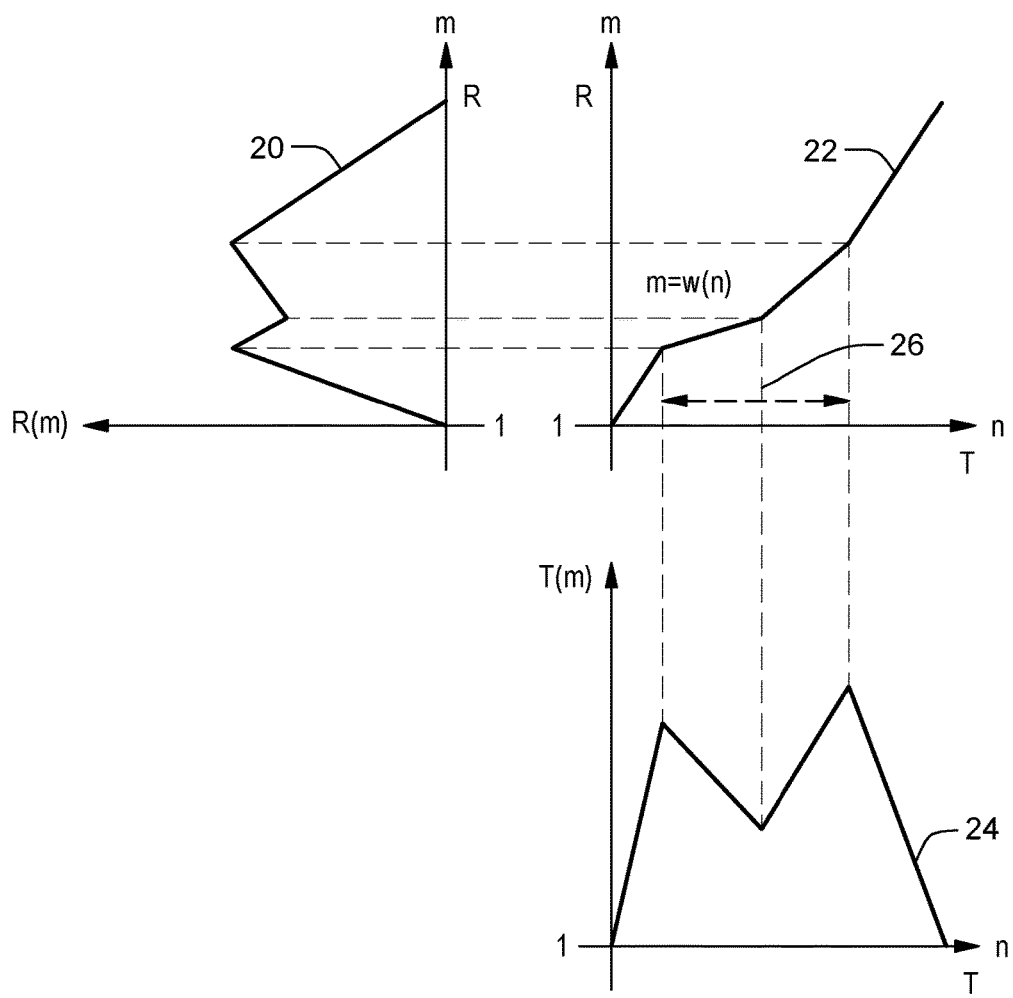
FIG. 2 illustrates an exemplary computer-implemented approach for performing dynamic time warping in accordance with the exemplary method of FIG. 1.

FIG. 2 illustrates an exemplary computer-implemented approach for performing dynamic time warping in accordance with block 103 of the exemplary method of FIG. 1. Dynamic time warping compares each of a plurality of reference patterns, such as a reference pattern 20, with a pattern received from a time-warped incoming speech signal, such as a test pattern 24. The reference pattern 20 is denoted as R(m), and the test pattern 24 is denoted as T(m). The warping function 22 is used to time-warp the incoming speech signal to generate the test pattern 24 comprising the time-warped signal, and the test pattern 24 is then compared to the reference pattern 20.

The plurality of reference patterns, including the reference pattern 20, are set in advance according to each of a plurality of spoken words or portions of spoken words. The test pattern 24 is indicative of a locus of a set of characterization vectors obtained from the incoming speech signal. In general, a duration of a pronunciation time for a given spoken word may be different depending on an individual's speaking habit. For this reason, it is not proper to use a non-time-warped spoken word determine whether the test pattern 24 and the reference pattern 20 are similar to each other according to the duration of pronunciation time for the spoken word. In consideration of this, the dynamic time warping method detects a locus of a central region 26 of a warping function 22 to compare the reference pattern 20 with the test pattern 24 regardless of the duration of the pronunciation time for the spoken word.

A number or quantity of characterization vectors of the test pattern 24, which are obtained from the incoming speech signal to be matched with the reference pattern 20, may be arbitrarily determined by a designer of a speech recognition semiconductor chip or a speech recognition algorithm. Also, any nth test pattern 24 having p characterization vectors can be described as $T(n)=\{t_k(n)|k=0, 1, \ldots, P-1\}$. Similarly, when there are $N_w$ different reference words, the reference pattern 20 for an rth word may be defined by $R(m)=\{r_l(m) |l=0, 1, \ldots, L-1\}$.

Here, $r_1(m)$ denotes a characterization vector and r has a range of $r\in|0, 1, \ldots, M-1|$. The reference pattern 20 is predetermined, and thus, it is possible to know the number or quantity of characterization vectors of a reference pattern for each word.

As previously discussed in conjunction with block 105 (FIG. 1), the time-warped signal is compared to a plurality of stored reference patterns (such as the reference pattern 20) to identify a set of one or more stored reference patterns of the plurality of stored reference patterns that is most similar to the time-warped signal. This comparison is performed using an acoustic similarity matrix to identify a candidate hot word from a list of candidate hot words. The acoustic similarity matrix is generated using a set of Gaussian Mixture Models (GMMs) and a signal classifier.

There are two distinct stages associated with practical use of the GMM, the training stage and the classification stage. Before a GMM can be used to classify a signal, the GMM must be trained with an appropriate set of training data to initialize parameters within the model to provide efficient performance. Thus, the GMMs are applied to the signal classifier to help identify an input speech signal when the classifier is provided with a set of exemplary reference inputs known as training data. Training the GMM involves establishing a set of optimized parameters using training data, such that an optimal classification takes place when the GMM is subject to new and previously unseen data.

After the signal classifier is trained, the classifier attempts to perform classification by generating from a vocabulary of words a set of words most likely to correspond to the input speech signal. With both of these stages, training and classification, data is presented to the classifier in a similar manner. When applied to classification of an incoming speech signal, a set of vectors representing the incoming speech signal is generated as follows. The incoming speech signal is digitized and divided into temporally defined segments of a fixed duration, where the fixed duration is selected to fall within the range of 1 millisecond to 100 milliseconds. According to another set of embodiments, the fixed duration is set to approximately 10 milliseconds.

A frequency spectrum is taken for each of the foregoing time segments, with a windowing function optionally being employed to compensate for truncation effects, to produce a spectral vector. Each element of the spectral vector represents a logarithm of integrated power within each different frequency band. The audible frequency range (approximately 20 Hz to 20,000 Hz), or the spectral range of the human voice (approximately 200 Hz to 4,000 Hz), are spanned by a plurality of contiguous bands. One element of the spectral vector is reserved to measure a logarithm of integrated power across all frequency bands. The logarithm of integrated power across all frequency bands represents an overall loudness of the incoming speech signal. For purposes of illustration, each spectral vector may have 25 spectral elements plus an element including the logarithm of integrated power across all frequency bands and, thus, the vector space may be 26-dimensional. These spectral vectors are time-ordered and constitute an input to the GMM, as a spectrograph representation of the incoming speech signal.

The GMM model is a model of a probability density function of its input vectors (the spectral vectors) in their vector space, parameterized as a weighted sum of Gaussian components or classes. Available parameters for optimization are a means matrix and a covariance matrix for each class, and prior class probabilities. The prior class probabilities are the weights of the weighted sum of the classes. These adaptive parameters are optimized for a set of training data by an adaptive, iterative re-estimation procedure such as an Expectation Maximization (EM) procedure or a log-likelihood gradient ascent algorithm, either of which are configured for finding a set of values for all of the adaptive parameters that maximize the training-set average of the logarithm of the GMM model's likelihood function (log-likelihood). These iterative procedures refine the values of the adaptive parameters from one iteration to the next, starting from a set of initial estimates. The set of initial estimates may just be random numbers lying in sensible ranges.

Once the adaptive parameters of the GMM have been optimized, those trained parameters are subsequently used for identifying the most likely of the set of alternative models for any observed spectral vector, to thereby perform a classification for the spectral vector. The classification step involves computing a likelihood that each component of the GMM could have given rise to the observed spectral vector. The GMM is a model of the probability density function of individual input vectors irrespective of their mutual temporal correlations.

Consider a GMM having a first set of Gaussians belonging to a first set of spectral vectors A_1 and a second set of Gaussians belonging to a second set of spectral vectors Z_1. All Gaussians belonging to the first and second set of spectral vectors are merged together to generate a merged Gaussian A_1, Z_1. Mathematically, this is denoted as:

$$dis(A1, Z1) = \sum_{i=1}^{MFCCDim} (mean_{A1}(i) - mean_{Z1}(i))^2 / \text{delta}(i)^2$$

where delta (i) is a global value, or the variance of the Gaussians merged from the first set of spectral vectors A_1 and the second set of spectral vectors Z_1.

Figure 3:
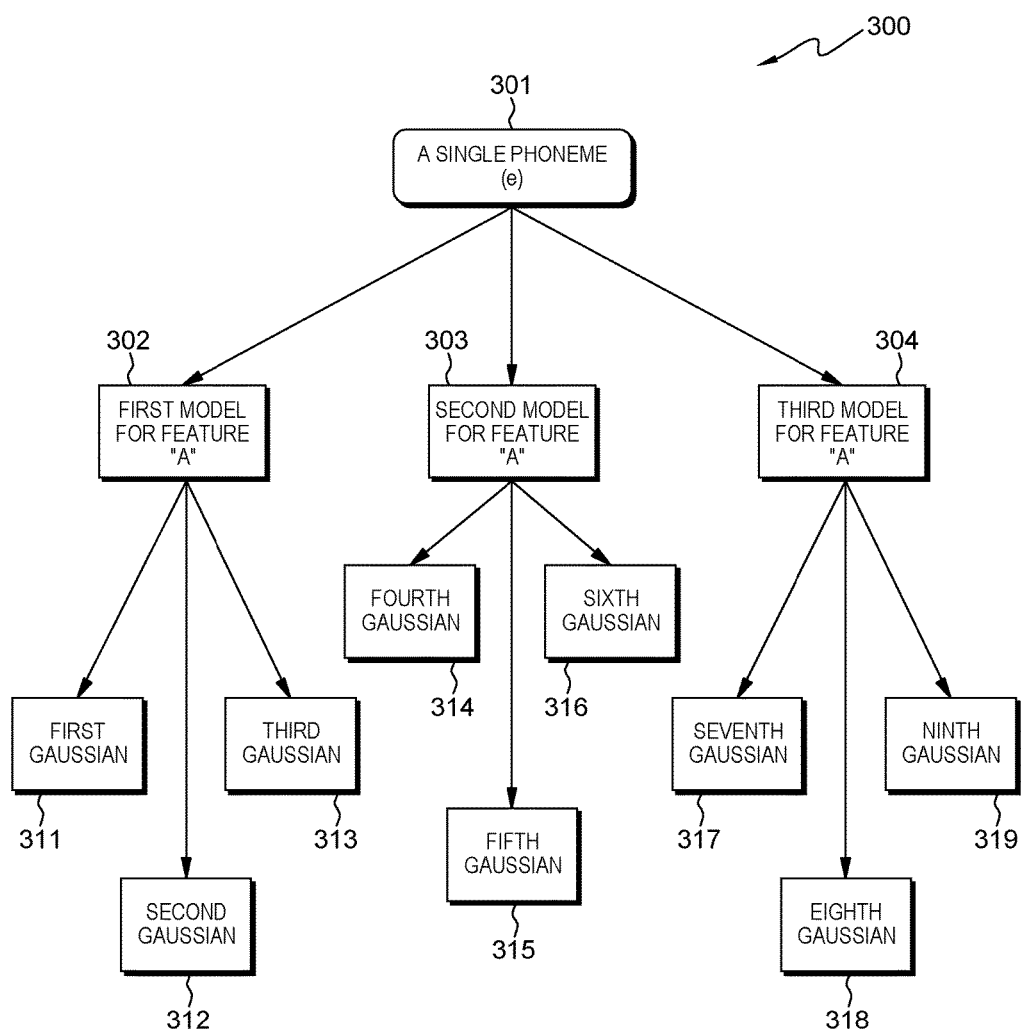
FIG. 3 illustrates an exemplary decision tree for generating an acoustic similarity matrix in accordance with the exemplary method of FIG. 1.

FIG. 3 illustrates an exemplary decision tree 300 for generating the acoustic similarity matrix of block 105 (FIG. 1). Returning to FIG. 3, a single phoneme 301, such as "e", is represented using a plurality of context-based models such as a first model 302, a second model 303, and a third model 304 for the phoneme 301. All of the context-based models 302, 303, and 304 are based upon a single feature, such as a feature denoted as Feature A. The first model 302 represents Feature A where A=1. Likewise, the second model 303 represents Feature A where A=2, and the third model 304 represents Feature A where A=n. Each model includes a plurality of Gaussians. For example, the first model 302 includes a first Gaussian 311, a second Gaussian 312, and a third Gaussian 313. Similarly, the second model 303 includes a fourth Gaussian 314, a fifth Gaussian 315, and a sixth Gaussian 316. Likewise, the third model 304 includes a seventh Gaussian 317, an eighth Gaussian 318, and a ninth Gaussian 319.

Figure 4:
FIG. 4 illustrates a portion of an exemplary acoustic similarity matrix generated using the decision tree of FIG. 3.

FIG. 4 illustrates a portion of an exemplary acoustic similarity matrix 400 generated using the decision tree 300 of FIG. 3. The acoustic similarity matrix illustrates a corresponding level of similarity between each of a first set of phones listed in a vertical column 401 and each of a second set of phones listed in a horizontal row 402. A level of similarity of "0" in the acoustic similarity matrix 400 indicates a comparison between two identical phones of the first and second set of phones. By contrast, increasing level of similarity values are indicative of increasing levels of dissimilarity between a first phone of the first set of phones and a second phone of the second set of phones. As used herein, a phone is a speech sound considered as a physical event without regard to its place in the sound system of a language. A phoneme refers to a member of the set of the smallest units of speech that serve to distinguish one utterance from another in a language or dialect. For example, the \p\ of English pat and the \f\ of English fat are two different phonemes. Thus, a phoneme is the smallest unit of speech that can be used to make one word different from another word.

Recall that the acoustic similarity matrix 400 (FIG. 4) is used at block 105 (FIG. 1) to identify a set of one or more stored reference patterns of the plurality of stored reference patterns that is most similar to the time-warped signal. At block 106, the one or more stored reference patterns that are most similar to the time-warped signal are used to identify a candidate hot word from a list of candidate hot words. Then, at block 107, the identified candidate hot word is refined using at least one of: a set of n-gram information, a semantic analysis of a named entity, or a set of Gaussian components.

In the fields of computational linguistics and probability, an n-gram is a contiguous sequence of n items from a given sequence of text or speech. The items can be phonemes, syllables, letters, words or base pairs according to the application. The n-grams are collected from a text or speech corpus. An n-gram assigns a probability to each possible next word from a sequence of candidate words extracted from the time-warped incoming speech signal. For example, a probability of a word w given some history h is denoted as P(w|h).

In order to refine the candidate hot word, a determination is made as to whether or not the candidate hot word needs to be corrected. This determination is made by considering a probability of a sentence that includes the candidate hot word. For example, consider the following sentence: "Their are five buildings in Chicago that are over 1,000 feet tall." A sentence starting with the phrase "There are" is much more probable than "Their are". The significant probability differential between "Their are" and "There are" is an indication that "Their" is an erroneous candidate word that needs to be refined by correcting the word to "There".

As mentioned previously, at block 107, the identified candidate hot word can be refined using a semantic analysis of a named entity. Named-entity recognition (NER) (also known as entity identification, entity chunking and entity extraction) is a subtask of information extraction that seeks to locate and classify named entities retrieved from an incoming speech signal into pre-defined categories such as names of persons, organizations, locations, expressions of times, quantities, monetary values, or percentages, for example.

An illustrative example of refining a detected hot word at block 107 (FIG. 1) is as follows. Assume that an incoming speech signal is processed in accordance with blocks 101-106 of FIG. 1 to generate an exemplary sentence "Samba loon do not like the air they get and just blow it back out because they want hot air, helium or hydrogen." In this sentence, the words "Samba" and "loon" may be regarded as candidate words for purposes of illustration. The procedure of block 107 recognizes that the words "Samba" and "loon" are incorrect using at least one of: the set of n-gram information, the semantic analysis of a named entity, or the set of Gaussian components. Accordingly, the hot words "Samba" and "loon" are corrected so that the refined sentence now reads, "Some balloons do not like the air they get and just blow it back out because they want hot air, helium or hydrogen."

Figure 5:
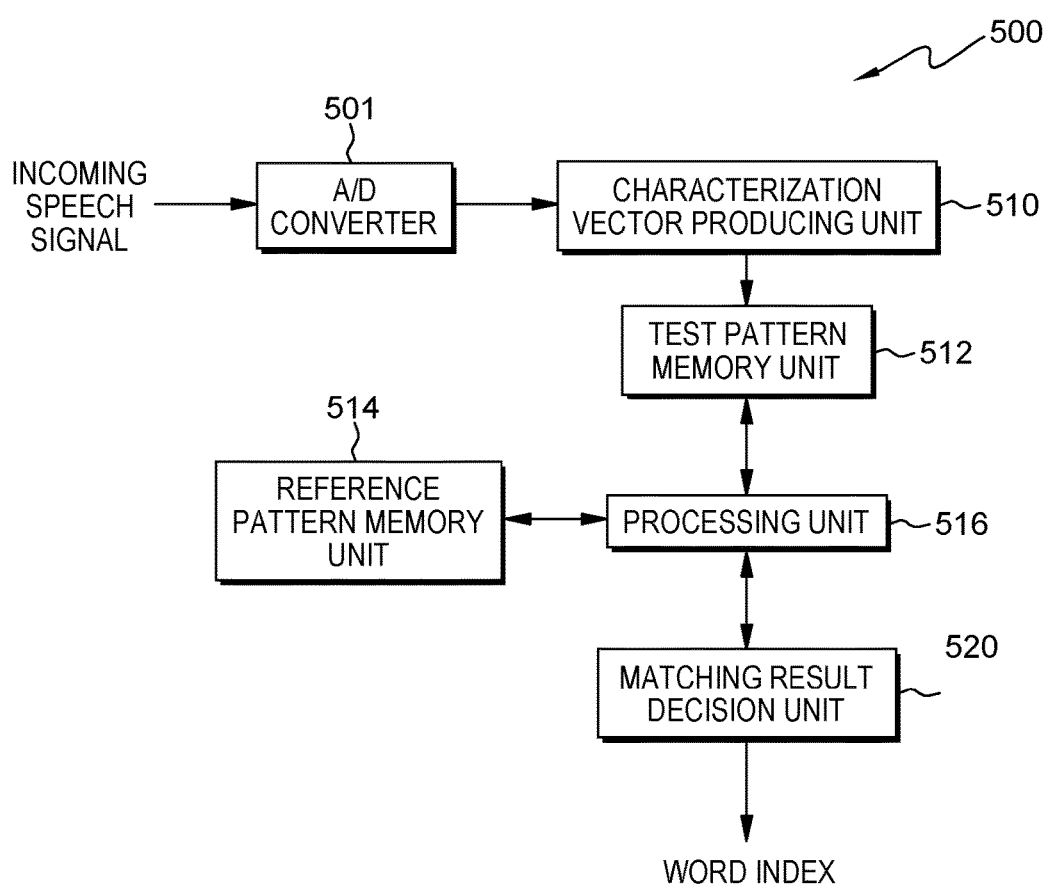
FIG. 5 illustrates a first exemplary apparatus in accordance with one or more embodiments of the present invention.

FIG. 5 is a block diagram of a first illustrative speech recognition apparatus 500 for performing the procedure of FIG. 1 according to the present invention. Referring to FIG. 5, the speech recognition apparatus includes an A/D converter 501 that converts an input analog speech signal into a digital speech signal. The A/D converter 501 is operatively coupled to a characterization vector producing unit 510 that produces a characterization vector from the digital speech signal. The characterization vector producing unit 510 is operatively coupled to a test pattern memory unit 512 that stores one or more test patterns such as the test pattern 24 (FIG. 2). The test pattern 24 comprises one or more characterization vectors. The test pattern memory unit 512 (FIG. 5) is operatively coupled to a processing unit 516.

The processing unit 516 is operatively coupled to a reference pattern memory 514 that stores one or more reference patterns such as the reference pattern 20 (FIG. 2). The reference pattern 20 comprises one or more characterization vectors corresponding to the speech of words to be recognized. The processing unit 516 (FIG. 5) includes at least one processing element, such as a microprocessor, that is programmed to perform the method of FIG. 1. The processing unit 516 (FIG. 5) is also programmed to perform classification of the digital speech signal using the stored reference patterns and the stored test patterns from the incoming speech signal. Accordingly, the processing unit 516 receives a test pattern and a reference pattern from the test pattern memory unit 512 and the reference pattern memory unit 514, respectively, and calculates a smallest matching cost value of the received reference pattern. A matching result decision unit 520, operatively coupled to the processing unit 516, outputs an index of one or more words corresponding to a reference pattern having the smallest matching cost value out of the output plurality of reference patterns. The matching result decision unit 520 is also configured for performing a refinement of the outputted index of one or more words, as was previously described in connection with block 107 (FIG. 1).

The A/D converter 501 (FIG. 5) samples and quantizes the incoming analog speech signal to convert it into the digital speech signal. The characterization vector production unit 510 produces a characterization vector to be used in patterning the digital speech signal. A filter bank (not shown), which is included in the characterization vector production unit 510, produces a plurality of characterization vectors per second. For example, twenty characterization vectors may be produced per second. Thus, if a word is pronounced for two seconds, forty characterization vectors are produced. The test pattern memory unit 512 stores input characterization vectors as one test pattern and transmits the test pattern to the processing unit 516. The processing unit 516 and the matching result decision unit 520 receive the characterization vectors of the reference pattern, which was stored in advance, in chronological order, select the best matching reference pattern, and output the index of a word or a set of words corresponding to the best matching reference pattern.

Figure 6:
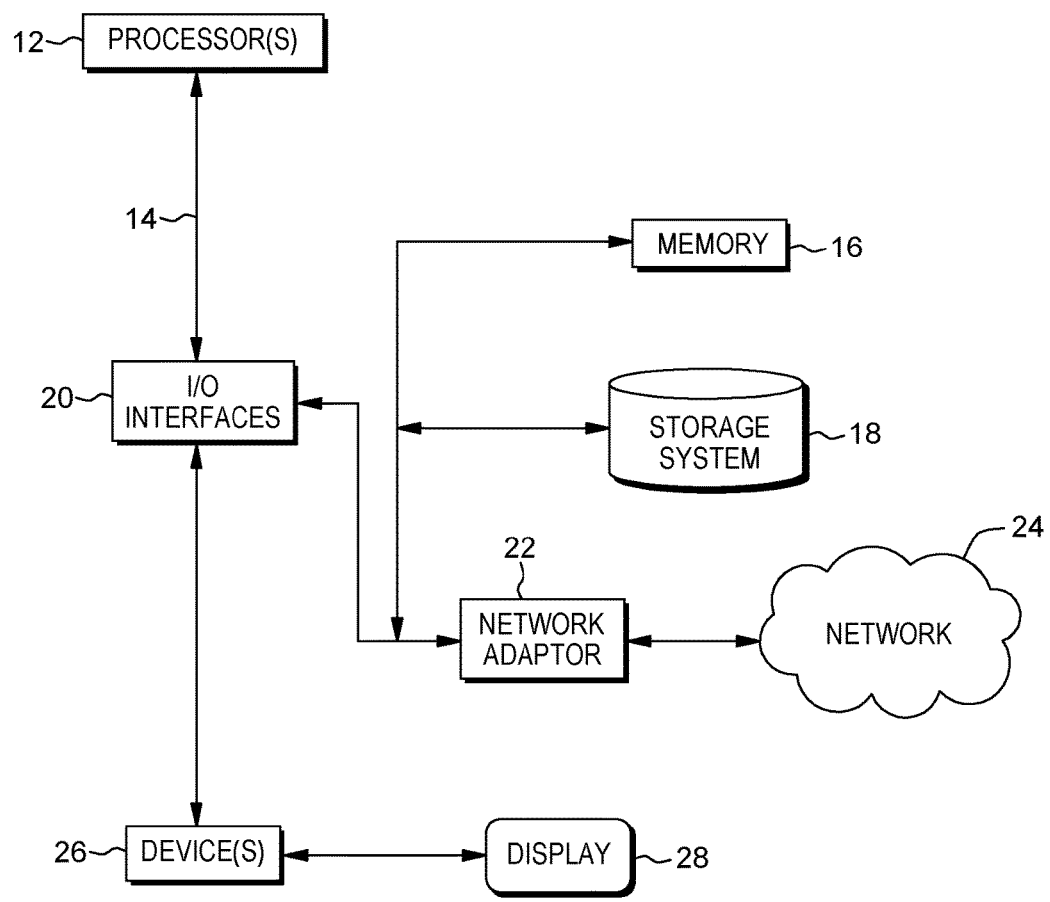
FIG. 6 illustrates a second exemplary apparatus in accordance with one or more embodiments of the present invention.

FIG. 6 illustrates a second exemplary apparatus in accordance with one or more embodiments of the present invention. This apparatus is only one example of a suitable processing system and is not intended to suggest any limitation as to the scope of use or functionality of embodiments of the present invention. The apparatus/processing system may be operational with numerous other general-purpose or special-purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may execute one or more modules that perform one or more methods in accordance with the present invention, e.g., the exemplary method described with reference to FIG. 1. By way of further example, the module(s) may be implemented by the integrated circuits of processor 12, and/or loaded (in the form of processor-readable/executable program instructions) from system memory 16, storage device 18, network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 can include computer system readable media in the form of volatile memory, such as random access memory (RAM, sometimes referred to as system memory), cache memory and/or other forms. Computer system may also include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

Figure 7:
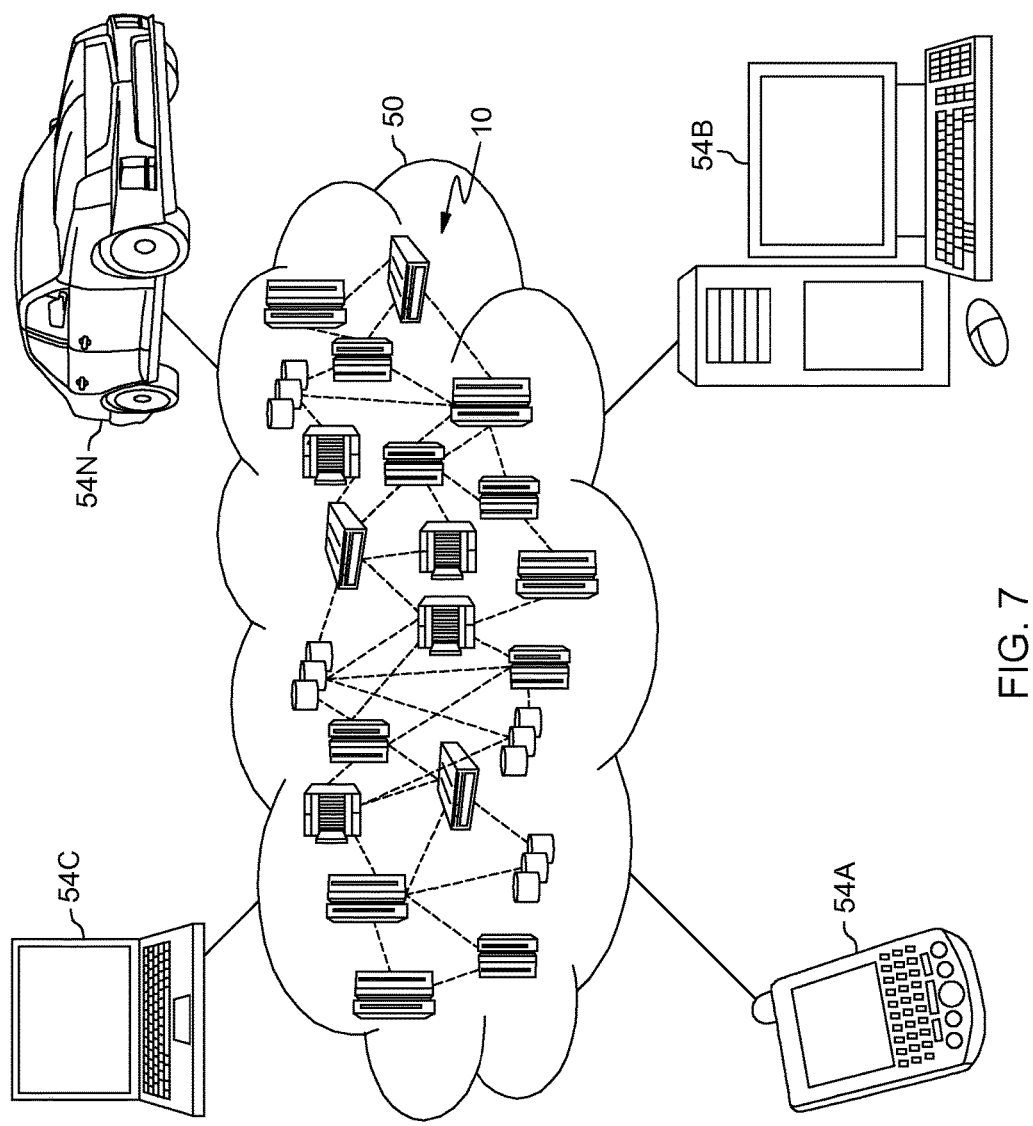
FIG. 7 depicts a cloud computing environment, according to embodiments of the present disclosure.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
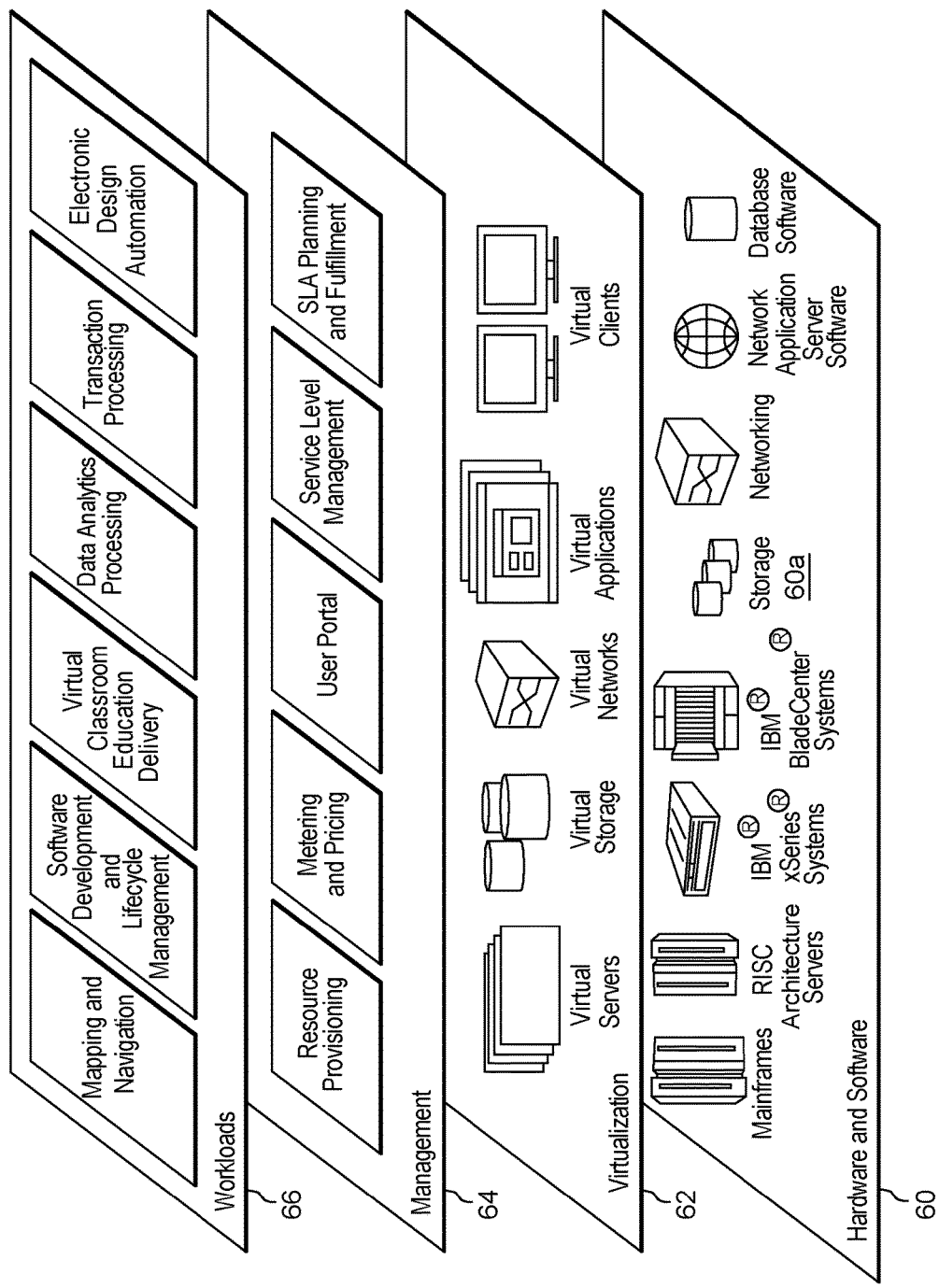
FIG. 8 depicts abstraction model layers, according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

software components. Examples of hardware components Hardware and software layer 60 includes hardware and include mainframes, in one example IBM zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and electronic design automation (EDA).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for performing speech recognition, the method comprising:

generating, by a computer, an acoustic similarity matrix using a set of Gaussian Mixture Models (GMMs) and a signal classifier, wherein the acoustic similarity matrix includes similarity values between a first set of phones and a second set of phones;

receiving, by the computer, a speech signal including one or more spoken phones;

applying, by the computer, a dynamic time warping procedure to the received speech signal to generate a time-warped signal, wherein the time-warped signal is among a test pattern indicative of a locus of a set of characterization vectors obtained from the speech signal;

comparing, by the computer, the time-warped signal to a plurality of stored reference patterns to determine a set of similarity values among the acoustic similarity matrix, the set of similarity values corresponding to the plurality of stored reference patterns, wherein each similarity value indicates a similarity level between the time-warped signal and each reference pattern, and an increase of the similarity value is indicative of an increase of dissimilarity between the time-warped signal and a reference pattern in the comparison;

identifying, by the computer, a reference pattern among of the plurality of stored reference patterns that has a smallest similarity value;

selecting, by the computer, a candidate hot word from a list of candidate hot words that corresponds to the identified reference pattern;

determining, by the computer, another hot word having a greater probability of occurrence than the candidate hot word; and refining, by the computer, the selection of the candidate hot word based on the said determining.

2. The computer-implemented method of claim 1 wherein the refining, by the computer, of the selection of the candidate hot word is performed using at least one of: a set of n-gram information, a semantic analysis of a named entity, or a set of Gaussian components.

3. The computer-implemented method of claim 2 wherein the refining, by the computer, of the selection of the candidate hot word is performed by evaluating a probability of occurrence of the identified candidate hot word.

4. The computer-implemented method of claim 3 wherein the refining, by the computer, of the selection of the candidate hot word includes changing the identified candidate hot word to the another candidate hot word having the greater probability of occurrence than the identified candidate hot word.

5. The computer-implemented method of claim 1 wherein the selecting, by the computer, of a candidate hot word from a list of candidate hot words further comprises generating the list of candidate hot words using the acoustic similarity matrix.

6. The computer-implemented method of claim 1 wherein the selecting, by the computer, of a candidate hot word from a list of candidate hot words further comprises generating the list of candidate hot words from an electronically searchable dictionary.

7. The computer-implemented method of claim 1, wherein the method is provided as a service in a cloud environment.

8. The method of claim 1, wherein comparing the time-warped signal to the plurality of stored references patterns comprises detecting a locus of a warping function to compare a reference pattern with the time-warped signal.

9. A computer program product for performing speech recognition, the computer program product comprising a computer-readable storage medium having a computer-readable program stored therein, wherein the computer-readable program, when executed on a computing device including at least one processor, causes the at least one processor to:
- generate an acoustic similarity matrix using a set of Gaussian Mixture Models (GMMs) and a signal classifier, wherein the acoustic similarity matrix includes similarity values between a first set of phones and a second set of phones;
- receive a speech signal including one or more spoken phones;
- apply a dynamic time warping procedure to the received speech signal to generate a time-warped signal, wherein the time-warped signal is among a test pattern indicative of a locus of a set of characterization vectors obtained from the speech signal;
- compare the time-warped signal to a plurality of stored reference patterns to determine a set of similarity values among the acoustic similarity matrix, the set of similarity values corresponding to the plurality of stored reference patterns, wherein each similarity value indicates a similarity level between the time-warped signal and each reference pattern, and an increase of the similarity value is indicative of an increase of dissimilarity between the time-warped signal and a reference pattern in the comparison;
- identify a reference pattern among of the plurality of stored reference patterns that has a smallest similarity value;
- select a candidate hot word from a list of candidate hot words that corresponds to the identified reference pattern;
- determine another hot word having a greater probability of occurrence than the candidate hot word; and
- refine the selection of the candidate hot word based on the said determination.

10. The computer program product of claim 9 wherein the refining is performed using at least one of: a set of n-gram information, a semantic analysis of a named entity, or a set of Gaussian components.

11. The computer program product of claim 10 wherein the refining is performed by evaluating a probability of occurrence of the identified candidate hot word.

12. The computer program product of claim 11 wherein the computer-readable program, when executed on a computing device including at least one processor, causes the at least one processor to refine the selection by changing the identified candidate hot word to the another candidate hot word having the greater probability of occurrence than the identified candidate hot word.

13. The computer program product of claim 9 wherein the selecting further comprises generating the list of candidate hot words using the acoustic similarity matrix.

14. The computer program product of claim 9 wherein the selecting further comprises generating the list of candidate hot words from an electronically searchable dictionary.

15. An apparatus for performing speech recognition, the apparatus comprising:
- at least one processor; and
- a memory coupled to the at least one processor, wherein the memory comprises program instructions which, when executed by the at least one processor, cause the at least one processor to:
- generating, by a computer, an acoustic similarity matrix using a set of Gaussian Mixture Models (GMMs) and a signal classifier, wherein the acoustic similarity matrix includes similarity values between a first set of phones and a second set of phones;
- receive a speech signal including one or more spoken phones;
- apply a dynamic time warping procedure to the received speech signal to generate a time-warped signal, wherein the time-warped signal is among a test pattern indicative of a locus of a set of characterization vectors obtained from the speech signal;
- compare the time-warped signal to a plurality of stored reference patterns to determine a set of similarity values among the acoustic similarity matrix, the set of similarity values corresponding to the plurality of stored reference patterns, wherein each similarity value indicates a similarity level between the time-warped signal and each reference pattern, and an increase of the similarity value is indicative of an increase of dissimilarity between the time-warped signal and a reference pattern in the comparison;
- identify a reference pattern among of the plurality of stored reference patterns that has a smallest similarity value;
- select a candidate hot word from a list of candidate hot words that corresponds to the identified reference pattern;
- determine another hot word having a greater probability of occurrence than the candidate hot word; and
- refine the selection of the candidate hot word based on the said determination.

16. The apparatus of claim 15 further configured for performing the refining using at least one of: a set of n-gram information, a semantic analysis of a named entity, or a set of Gaussian components.

17. The apparatus of claim 16 further configured for performing the refining by evaluating a probability of occurrence of the identified candidate hot word.

18. The apparatus of claim 17 further configured for performing the refining by changing the identified candidate hot word to the another candidate hot word having the greater probability of occurrence than the identified candidate hot word.

* * * * *